US009408050B2

(12) United States Patent
Tucek et al.

(10) Patent No.: US 9,408,050 B2
(45) Date of Patent: Aug. 2, 2016

(54) REDUCING BANDWIDTH USAGE OF A MOBILE CLIENT

(71) Applicant: Hewlett-Packard Development Company, L.P., Fort Collins, CO (US)

(72) Inventors: Joseph A. Tucek, Palo Alto, CA (US); Mark David Lillibridge, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 404 days.

(21) Appl. No.: 13/755,332

(22) Filed: Jan. 31, 2013

(65) Prior Publication Data
US 2014/0215001 A1    Jul. 31, 2014

(51) Int. Cl.
| | | |
|---|---|---|
| *H04W 4/18* | (2009.01) | |
| *G06F 17/30* | (2006.01) | |
| *H04L 29/08* | (2006.01) | |
| *H04L 12/801* | (2013.01) | |

(52) U.S. Cl.
CPC ........... *H04W 4/18* (2013.01); *G06F 17/30902* (2013.01); *H04L 67/2847* (2013.01); *H04L 47/12* (2013.01); *H04L 47/14* (2013.01); *H04L 67/28* (2013.01); *H04L 67/2852* (2013.01)

(58) Field of Classification Search
CPC ...................... H04L 29/08072; H04L 41/0213; H04L 29/06; H04L 29/08144; H04L 47/10; H04L 45/02
USPC .................................. 709/213, 203, 223, 230
See application file for complete search history.

(56) References Cited

U.S. PATENT DOCUMENTS

| | | | | | |
|---|---|---|---|---|---|
| 6,021,426 | A | * | 2/2000 | Douglis et al. | ................ 709/200 |
| 6,178,461 | B1 | * | 1/2001 | Chan | ................. G06F 17/30902 707/E17.12 |
| 6,757,708 | B1 | * | 6/2004 | Craig | ................. G06F 17/30902 707/999.01 |
| 7,975,025 | B1 | * | 7/2011 | Szabo | ............... G06F 17/30902 709/203 |
| 8,112,475 | B2 | * | 2/2012 | Tran | ...................... G06F 9/4843 455/418 |
| 8,326,923 | B1 | * | 12/2012 | Szabo | ............... G06F 17/30902 709/203 |
| 8,726,151 | B2 | * | 5/2014 | Rahaman et al. | ............ 715/255 |
| 8,935,480 | B1 | * | 1/2015 | Chien | ............... G06F 17/30902 709/219 |
| 2003/0195924 | A1 | * | 10/2003 | Franke | .................. H04L 69/329 709/203 |

(Continued)

OTHER PUBLICATIONS

Drew, S., et al.; Mobility-aware Web Prefetching Over Heterogeneous Wireless; Sep. 5-8, 2004; http://ieeexplore.ieee.org/xpl/articleDetails.jsp?tp=&arnumber=1370958&contentType=Conference+Publications&queryText%3DMOBILITY-AWARE+WEB+PREFETCHING+OVER+HETEROGENEOUS+WIRELESS > on pp. 687-691; vol. 1.

(Continued)

*Primary Examiner* — Backhean Tiv
(74) *Attorney, Agent, or Firm* — Trenner Law Firm, LLC (57) ABSTRACT

Systems and methods of reducing bandwidth usage of a mobile client are disclosed. An example method may include caching a first version of network content in a mobile client. The method may also include comparing the cached content with a second version of the network content. The method may also include generating a recipe to construct the second version of the network content from the cached network content based on a result of the comparing. The method may also include sending the recipe to the mobile client.

19 Claims, 5 Drawing Sheets

(56) References Cited

U.S. PATENT DOCUMENTS

| | | | |
|---|---|---|---|
| 2006/0077897 A1* | 4/2006 | Kotzin | 370/235 |
| 2008/0229024 A1* | 9/2008 | Plamondon | H04L 67/28 711/126 |
| 2009/0028142 A1* | 1/2009 | Schmidt et al. | 370/389 |
| 2009/0124284 A1* | 5/2009 | Scherzer | H04M 1/72561 455/552.1 |
| 2010/0070628 A1* | 3/2010 | Harrang | H04L 47/10 709/224 |
| 2010/0085947 A1* | 4/2010 | Ringland | H04W 28/00 370/338 |
| 2010/0205292 A1* | 8/2010 | Diaz | H04L 12/40013 709/224 |
| 2012/0155292 A1* | 6/2012 | Zazula | H04L 41/145 370/252 |
| 2012/0166665 A1 | 6/2012 | Martin | |
| 2012/0221697 A1 | 8/2012 | Sainio et al. | |
| 2012/0233031 A1* | 9/2012 | Chang | G06F 17/30017 705/27.1 |
| 2013/0229270 A1* | 9/2013 | Srinivasan | H04W 36/18 340/328 |
| 2014/0108462 A1* | 4/2014 | Pfeifle et al. | 707/795 |
| 2014/0215071 A1* | 7/2014 | Lee et al. | 709/225 |

OTHER PUBLICATIONS

Armstrong, T., et al.; Efficient and Transparent Dynamic Content Updates for Mobile Clients; Jun. 19-22, 2006; http://static.usenix.org/events/mobisys06/full_papers/p56-armstrong.pdf > on pp. 56-68.

Resource Management for Scalable Disconnected Access to Web Sevices; May 1-5, 2001; http://wwwconference.org/www10/cdrom/papers/432/index.html >.

* cited by examiner

REDUCING BANDWIDTH USAGE OF A MOBILE CLIENT

BACKGROUND

In an age of mobile devices (e.g., the so-called "smart phones") and software that run on these devices (e.g., so-called "apps"), data usage has become an increasing concern for users. Most carriers have ended or restricted "unlimited" data plans, have moved users to "pay-for-use" data plans, and often charge overage fees for exceeding allotted data usage. Reducing data usage by mobile devices can be valuable, especially when connecting over an "expensive" carrier network.

While users can manually adjust settings on their mobile devices to help reduce data usage (e.g., by turning off social media apps), many users consider this a hassle. Other users do not think about their data usage until they receive an invoice showing overage charges.

DETAILED DESCRIPTION

Bandwidth consumption can raise concerns for users of carrier networks, e.g., those on limited data plans. But many mobile devices are capable of at least dual-mode connectivity, wherein the mobile device may be connected to inexpensive (and typically faster) wireless local area networks (e.g., Wi-Fi) when available (e.g., at the users house or a Wi-Fi hotspot), and via expensive (and typically slower) carrier networks. The systems and methods disclosed herein implement "smart" caching and/or "smart" prefetching of data. That is, the decision to cache and/or prefetch data is based at least in part on the "cost" of the network connection. As such, the systems and methods reduce expensive bandwidth usage of a mobile client by prefetching when inexpensive bandwidth is available.

In an example, a first version of network content is cached in the mobile client. The term "cached" is used herein to refer to network content being stored on the mobile client for possible later use. The cached network content may have been retrieved when the user visited a network site or the cached network content may have been prefetched. The term "prefetch" is used herein to refer to the network content being gathered automatically before being needed without the user necessarily even visiting the network site, e.g., based on a likelihood that a user will later visit the website.

The first version of the network content may be cached when the mobile client is connected over an inexpensive network connection (e.g., a WiFi connection). Later, when the user desires to access the network content and the mobile client is connected over an expensive network connection (e.g., a carrier network), a more recent second version of the network content may be available.

Instead of the mobile client directly retrieving the second version of the network content via the expensive network connection, the first and second versions of the network content are compared off of the mobile client. In an example, the comparison may include dividing the second version of the network content into one or more data chunks, which are then compared with data chunks of the first version of the network content.

A recipe is generated based on the comparison that can be used by the mobile client to construct a copy of the second version of the network content from its cached network content. An example recipe includes a reference to a data chunk that is unchanged between the first version of the network content and the second version of the network content. The recipe may also include a reference to a data chunk of the first version of the network content and an edit script to transform that data chunk into a data chunk of the second version of the network content.

The mobile client uses the recipe to provide the user with the fresh content of the second version, by constructing a copy of the second version locally using the recipe and the cached network content. It does this without having to retrieve the entire content over the expensive network connection. As such, the systems and methods effectively reduce bandwidth usage of the mobile client when connected via the carrier network, without degrading the quality or timeliness of content provided to the user. The systems and methods may also be used during times of poor network connectivity, for example, when the user is traveling in areas without good network connectivity. The mobile client may update its cache with the more recent data, replacing the first version of the network content with the second version of the network content.

Before continuing, it is noted that as used herein, the terms "includes" and "including" mean, but are not limited to, "includes" or "including" and "includes at least" or "including at least." The term "based on" means "based on" and "based at least in part on."

Figure 1:
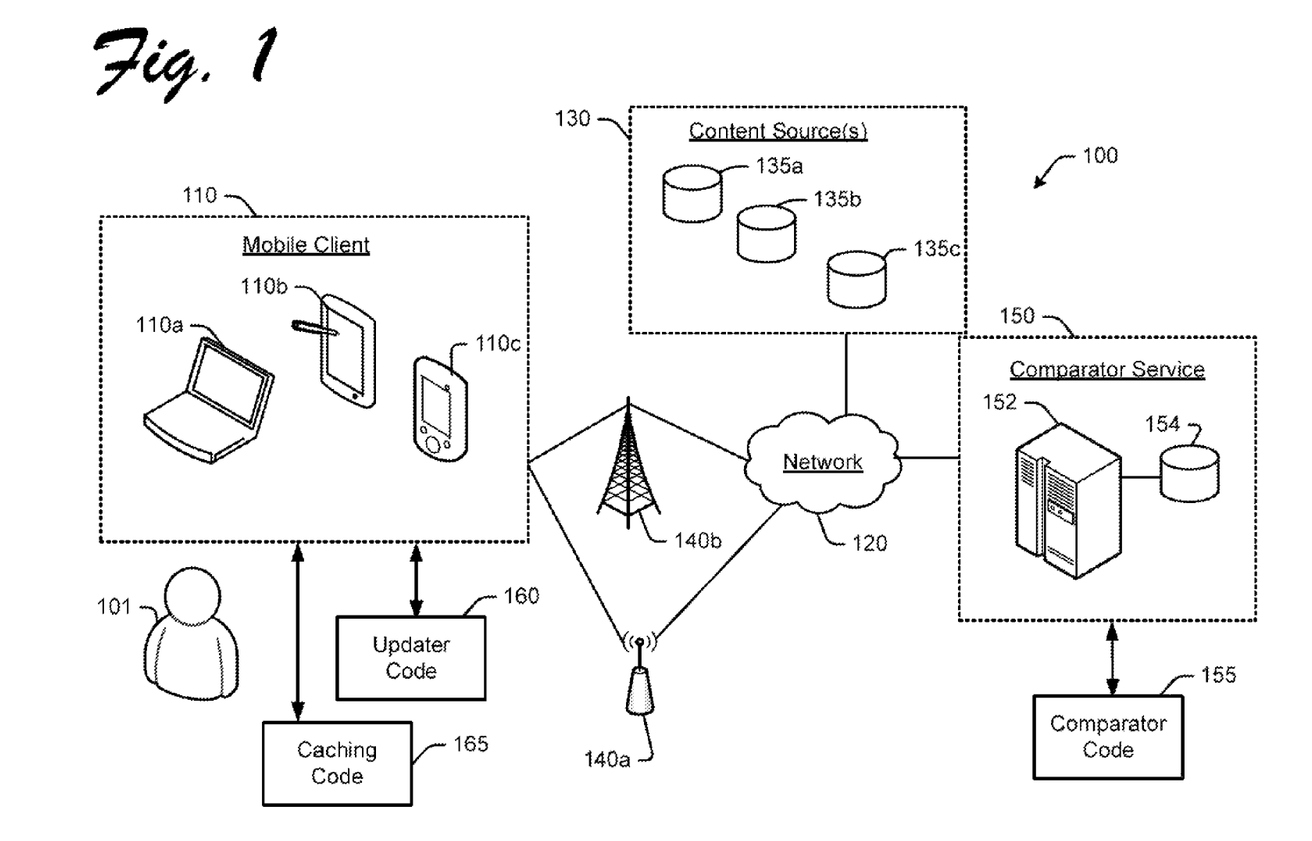
FIG. 1 is a high-level illustration of an example system which may be implemented for reducing bandwidth usage of a mobile client.

FIG. 1 is a high-level block diagram of an example system 100 that may be implemented for reducing bandwidth usage of a mobile client. System 100 may be implemented with any of a wide variety of computing devices or mobile clients 110, such as, but not limited to, mobile computers (e.g., laptops 110a and tablet devices 110b), mobile devices (e.g., smart phones 110c), and even mobile appliances such as devices installed in vehicles (not shown), to name only a few examples. Each of the computing devices may include memory, storage, and a degree of data processing capability at least sufficient to manage a communications connection via a communication network 120, such as the Internet.

The communication network 120 may provide a user 101 with access to network sites 130 (e.g., a website), including one or more content sources 135a-c (e.g., web pages). The content source 135a-c may be a local source of content (e.g., provided on a local area network or LAW a remote source of content (e.g., provided on a wide area network or WAN), and/or a distributed source of content. That is, the source may be physically distributed throughout both the LAN and WAN.

The content source 135a-c may include any type of content. For example, the content source 135a-c may include databases for providing information, applications for providing application data, storage resources for providing online storage facilities. There is no limit to the type or amount of content that may be provided by the source. In addition, the content may include unprocessed or "raw" data, or the content may undergo at least some level of processing.

The mobile clients 110 may access the network sites 130 on communications network 120 via a carrier network 140a (e.g., a 3G or 4G network) and/or wired or wireless access point or WAP 140b (e.g., Wi-Fi). Typically, accessing the communications network 120 via the carrier network 140a is considered the expensive (and typically slower) network connection; and accessing the communications network 120 via the WAP 140b is considered the inexpensive (and typically faster) network connection. Therefore, it may be desirable to reduce bandwidth of the mobile clients 110 when connected via the carrier network 140a.

Caching websites may be used to improve the user experience when slower Internet connections are used. In an example, the mobile client 110 caches web pages on local storage the first time a user visits a website. Then when the user returns to the same website at a later time, the mobile client 110 simply displays the web pages stored in the cache for that website if they have not expired. When websites provide content, they generally provide "expiration time" or "time to live (TTL)" information, which indicates how long that content should be cached according to the website. In essence, the website gives permission to the mobile client to just go ahead and use the cached content without checking with the website to see if it has changed for that amount of time. The website balances off the risk of staleness (expiration time too long) versus loss of efficiency (expiration time too short, causing unnecessary network traffic). Other network content besides websites may, of course, be cached as well.

Even if content in the cache has expired, it may still be usable if the website indicates that it is still good. If the content has expired, the mobile client 110 may ask the website for the current content, indicating what version (e.g., via a timestamp of when it was fetched or an identifier such as an etag), if any, it already has of the content in its cache. If the content on the website has not changed from what was cached, the website instead of returning a copy of the entire content may simply indicate to the mobile device 110 that its cached content is still good and that mobile device 110 may extend the content's expiration time by a given amount. If the content on the website has changed (even by one byte), the website returns the entire new content to the mobile client 110, which may cache the new version with its new expiration time in place of the old version.

Caching works well to speed up the display of web pages, because the device does not need to retrieve the same web page from the network each time the user visits the same website. The amount of data that can be cached on a mobile device is limited by storage constraints. That is, mobile devices often do not have the seemingly unlimited storage resources of desktop computers.

Further, modern web pages are becoming less cacheable as the rate of change of content and the level of personalization increases. That is, modern web pages are much more dynamic than websites from even just a few years ago, often being changed on a regular basis (e.g., daily, hourly, or more frequently). This means reduced expiration times or more frequent changes in the content version, either of which can force download of the entire content instead of using the cached content. Further, due to either misconfiguration or an abundance of caution, some websites will report that dynamically generated content has changed and that cached versions are invalid even in the absence of actual changes. Even static websites are often changed at least somewhat, such that the content version may indicate the cached version of the website is out of date and needs to be updated.

As such, the mobile device already consumed bandwidth caching the website during the first visit, and after determining the cached website is out of date on a later visit, the mobile device consumes more bandwidth to retrieve the updated website. Accordingly, the systems and methods disclosed herein implement smart caching and/or "smart" prefetching of data to reduce expensive bandwidth usage of a mobile client. That is, the decision to cache and/or prefetch data is based at least in part on the "cost" of the network connection.

In an example, the system 100 may include comparator service 150. The comparator service 150 may be implemented by a host. The host may be configured as a server computer 152 with computer-readable storage 154. For purposes of illustration, the comparator service 150 may be an online service executing program code or comparator code 155.

In an example, the comparator code 155 compares first and second versions of the network content, so that the new version of only those portions that have changed need be sent to mobile device 110 so it can construct a copy of the second version. In an example, comparison may include dividing the second version of the network content into one or more data chunks, which are then compared with data chunks of the first version of the network content. The comparator code 155 may also generate a recipe based on the comparison.

An example recipe includes a reference to a data chunk that is unchanged between the first version of the network content and the second version of the network content. The recipe may also include a reference to a data chunk of the first version of the network content and an edit script to transform that data chunk into a data chunk of the second version of the network content.

The mobile client uses the recipe to provide the user with fresh content, by constructing a copy of the second version from the recipe and the cached network content, without having to retrieve the entire content over the expensive network connection. In an example, the mobile client executes program code such as updater code 160 and caching code 165. The updater code 160 constructs a copy of the second version of the network content from the cached network content, based on the recipe. The caching code 165 implements "smart" caching and/or "smart" prefetching of data.

In an example, the program code (e.g., comparator code 155, updater code 160, and/or caching code 165) may be implemented with application programming interfaces (APIs) and related support infrastructure.

Figure 2:
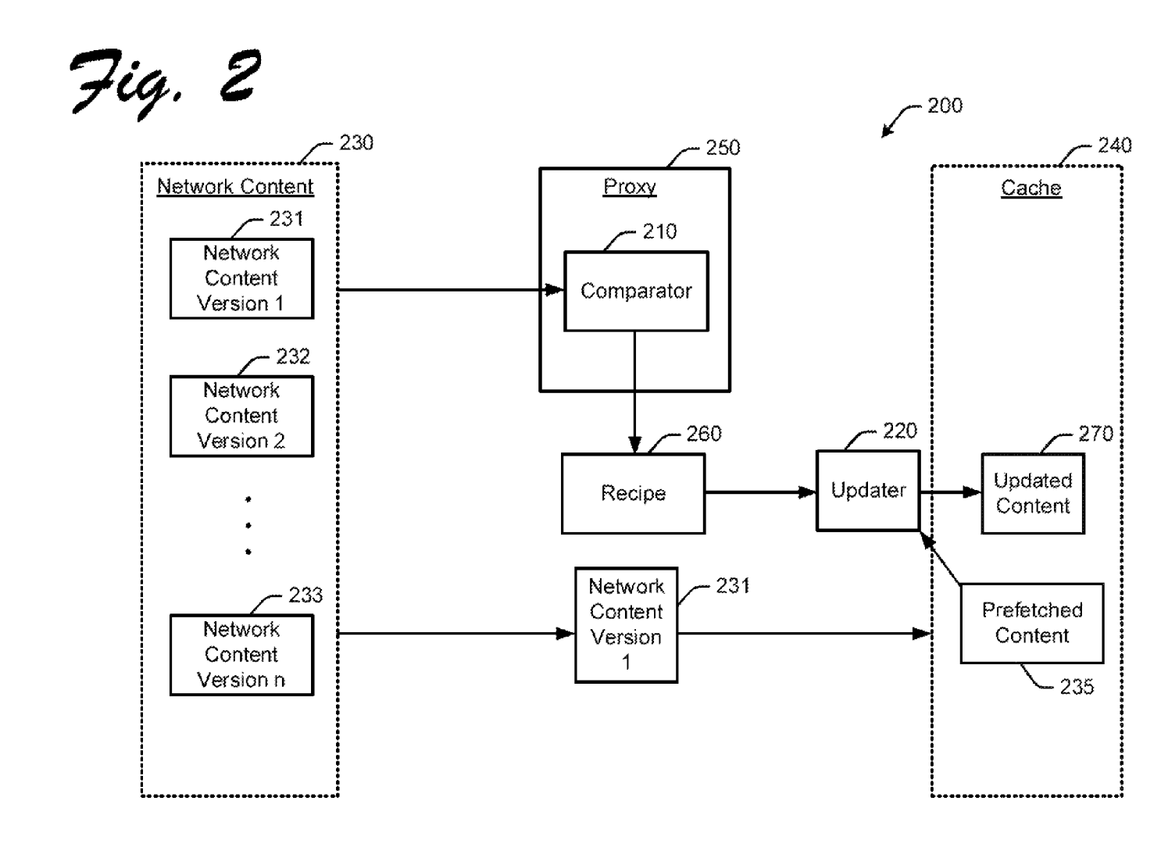
FIG. 2 shows an example architecture for reducing bandwidth usage of a mobile client, including executable machine readable instructions.

Program code used to implement features of the system can be better understood with reference to FIG. 2 and the following discussion of various example functions. However, the operations described herein are not limited to any specific implementation with any particular type of program code.

FIG. 2 shows an example architecture for reducing bandwidth usage of a mobile client, including executable machine readable instructions. The program code discussed above with reference to FIG. 1 may be implemented via machine-readable instructions (provided in the form of, but not limited to, software or firmware). The machine-readable instructions may be stored on non-transient computer readable media and are executable by one or more processors to perform the operations described herein. It is noted, however, that the components shown in FIG. 2 are provided only for purposes of illustration of an example operating environment, and are not intended to limit implementation to any particular system.

In an example, the program code is architected as self-contained modules. These modules can be integrated within a self-standing tool, or may be implemented as agents that run on top of an existing program code. In an example, the architecture of the machine readable instructions may include a comparator 210 and an updater 220.

At the simplest level, while a mobile client is connected to an inexpensive network connection and has good power), the mobile client retrieves network content 230 from the network. The network content 230 may include one or more versions 231-233. Only one of these, the current version, may be available from network content 230 at any one time. In an example, the mobile client retrieves a first version of the network content 231, wherein the term "first" refers only to the version first retrieved by the mobile client and not necessarily the first version of the existence of the content. The term "second" refers to the version of the network content that is current when the mobile client user desires access to the network content. It is noted that the "first" version of network content may be a tenth version (or even later) as maintained or numbered by the network site. Likewise, the "second" version may actually be the fifteenth version for even later) as maintained or numbered by the network site. But when used in a relative sense, the terms "first" and "second" refer to the current version when the mobile client accesses the network for a corresponding "first" and "second" time.

As noted above, the mobile client may retrieve network content as prefetched content 235. That is, the mobile client may retrieve network content without the user visiting the network site. The mobile client may also cache content when the user visits the network site. In either case, the first version of the network content 231 is stored in cache 240 on the mobile client.

The mobile client may also notify a proxy 250 executing the comparator 210, of the contents in cache 240. In an example, the mobile client may retrieve the prefetched content 235 through the proxy 250, which allows the proxy 250 to make a copy of the prefetched content 235. In another example, the mobile client may retrieve the prefetched content 235 directly and send a message to the proxy 250 describing which content has been prefetched and possibly additional information about the content like the hashes of its chunks.

It is noted that the proxy 250 may be operated by the carrier, and may serve many customers of the same carrier. In another example, the proxy 250 may be operated by the network site, and service the users of that network site (e.g., via a dedicated app). In another example, the proxy 250 may be operated by the user, serving his or her own purposes and via the user's own network connection at their home or place of business.

In any case, when the mobile client is using an expensive connection at some later time, the mobile client sends a request to the proxy 250, which sends back a recipe 260 for creating an up-to-date version of the requested resource using the contents of the cache 240 (e.g., the first version of the network content 231, that is prefetched content 235).

The mobile client now can construct (via updater 220) a copy of the current version of the network content, the second version of the network content, namely updated content 270, even though the prefetched content 235 may have become stale. Less bandwidth has been used because the recipe 260 can limit itself to only the changes that have occurred since the network content was prefetched.

It is noted that the recipe 260 is not limited to any particular implementation. In an example, the recipe 260 may be implemented as an edit script between the old and new version. An edit script (sometimes called a "diff") is a list of insertions, deletions, and transpositions/moves which turns one string into another. Various techniques may be used, to compute minimal edit scripts using dynamic programming.

In another example, the recipe 260 may be implemented with deduplication. For example, the recipe 260 may be constructed as a list of "new data chunks" and references to old data chunks. Resources can be divided into approximately 100 byte chunks chosen so that local changes tend not to change chunk boundaries.

In another example, the edit script and deduplication techniques can be combined. For example, the recipe 260 may include substituting the notion of finding similar chunks for that of finding exact copies, and using edit scripts to transform "old" chunks into "new" chunks.

Although the recipes 260 have been described as being between an old version and a new version, it is also possible to use other content as input to a recipe 260. For example, all of the cached content on a mobile client could be considered as possible inputs for a recipe 260 by the proxy 250. For efficiency, the proxy 250 may choose to consider a smaller set of cached content (e.g., pages from the same web site, or pages downloaded recently). To choose good inputs, it may be useful to consider resources containing chunks with the same hash. Broder-fingerprints may also be used to find good targets to "diff" against.

These techniques are useful because different web sites and web pages within a website often have highly similar content. For example, the "Top Stories" sidebar on a news site may be the same for all of its pages during any short time period. Similarly, many different news web sites may have the same article from a common source (e.g., the AP), but surrounded by their own ads and other formatting.

The mobile device may also clean the cache 240, e.g., to keep the cache from filling up and/or to enhance performance. Storage and performance constraints apply to a lesser extent to the proxy 250, because the proxy 250 is likely responsible for many clients. Still, for cost reasons, it may be desirable to clean the proxy 250 cache (e.g., thus increasing the number of clients a single proxy can handle).

It may not be desirable to prematurely evict content from the mobile device's cache, for example, if the mobile device has to re-download that content again when the user desires access. Therefore, the decision to clear or "evict" content from the cache may be based on an analysis of one or more metrics. The overall goal is to maximize expected saved bytes versus spent cache capacity. Various sub-metrics can also be applied. An example metric is the likelihood the mobile client will actually access a cached item in the future at a given time. For example, it may be estimated that there is a fixed 10% chance of accessing particular cached content over the next day, and 0% after that.

Another example metric is how stale the cached content is expected to be when the user does access it. For example, image files may never become stale, while news web pages may change at an estimated rate (e.g., 10% of the content changes every hour).

These metrics can be combined to produce another metric of how many bytes are expected to be saved by continuing to cache (e.g., deciding not to evict) a given content object. The combination may be accomplished by multiplying the estimates and then integrating over time (e.g., until the next prefetch, or for all time). For example, if $u(t)$ is the probability density function that a given piece of content will be accessed at time t and $s(t)$ is the expected degree of staleness of that content at time t, then a combined metric for that content may be the integration of $u(t)*s(t)$ over time.

By way of illustration, the mobile client may prefetch a funny cat video linked from a news website, because as a video it does not change, and because the user often follows links from the news website. However, after that video has not been viewed for a predetermined time, and is no longer linked to by the news website, the probability that the user will ever look at the video is low. Therefore, the expected bytes saved versus the size the video consumes in the cache is now small, justifying evicting the video.

In the eviction case, the proxy 250 can actually directly measure the staleness of a web page by requesting the latest version. This is somewhat expensive, but it may be useful for the client to decide between a number of candidates for eviction. I.e., the client uses its local knowledge to come up with some candidates and then asks the proxy to help it choose between them by directly measuring their staleness. The proxy may also have more recent information about staleness than the client that can be leveraged to help make better eviction decisions because the proxy may have downloaded a more recent version for another client.

It is also noted that to improve storage capacity, the proxy may leverage data-reduction techniques, Example data reduction techniques that may be utilized, for example when clients often request the same/similar data, include, but are not limited to single instancing, deduplication, and storing versions of objects/chunks as chains-of-diffs.

Figure 3:
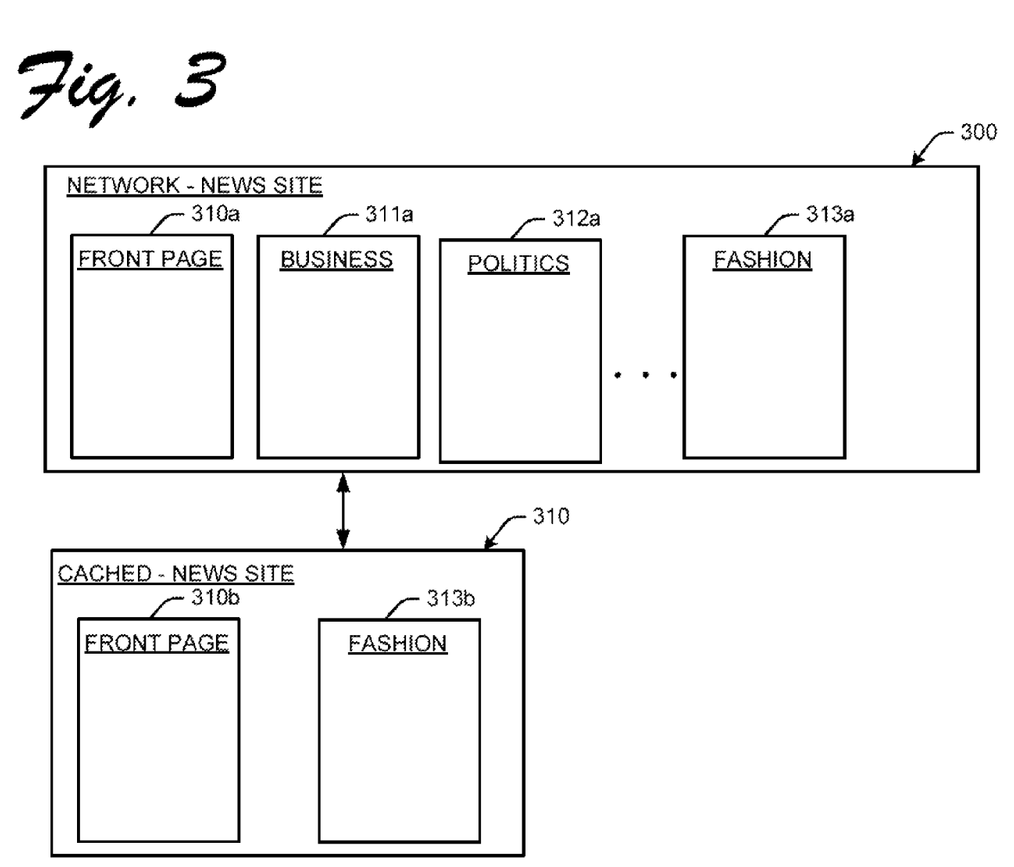
FIG. 3 is a high-level illustration of prefetching to reduce bandwidth usage of a mobile client.

FIG. 3 is a high-level illustration of prefetching to reduce bandwidth usage of a mobile client. In this illustration, consider a commuter who always reads the newspaper online on the train. Before leaving home and the inexpensive network connection, the mobile client can fetch the latest front page of the newspaper from the network site. The mobile client may also follow all of the links on the front page to retrieve some or all of the content for the newspaper from the network site. The network content is stored in the cache of the mobile client.

The illustration in FIG. 3 shows the newspaper site 300 which may be hosted as a website including web pages 310*a*, 311*a*, 312*a*, and 313*a*. In an example, the mobile client may prefer to cache the entire news site 300 when the mobile client is connected via an inexpensive link (e.g., a Wi-Fi connection). However, because the mobile client may have limited capacity, the mobile client may be choosy about what is prefetched.

By way of illustration, if the user always reads the front page 310*a* and the fashion section 313*a* right after getting on the train, the mobile client may choose to prefetch only these sections for the cached versions 310*b* and 313*b*. Even though the cached versions 310 may become stale at a high rate, if the user is expected (e.g., with high probability) to read these sections soon, then it is reasonable to expect a sufficient byte savings to justify using the cache space.

Another example of deciding which sections to prefetch ignores the time element, and may, for example, use a single "will the user access this object before the next prefetch period?" estimate. This estimate does not assign different probabilities to different future times. These estimates may also disregard the expiration time and cacheability flags a web site provides, as these may not be accurate.

Other techniques may be used to determine which portions of a network site to prefetch. For websites with a good history of access patterns, the mobile client can use these historic rates of change and historic likelihood of access for the estimates. Even if an exact page has not been accessed before (e.g., a new article), it is still reasonable to presume that web pages on a particular site are likely to behave like other pages on that site. For example, news articles may have updates and corrections applied in the first few days, but never change again after that. Users are more likely to access new articles, with a decaying probability the older the article gets. Standard AI and clustering techniques can also be used to predict likelihood of access and rate of becoming stale.

For websites which do not have a history of access, a variety of empirically derived heuristics may be applied. For example, media files typically do not change, static HTML files may change at a slower rate than blog posts, users rarely click on ads, and ads become different quickly. Least Recently Used (LRU) and Most Frequently Used (MFU) metrics per-user and per-page can give rough estimates of what is likely to be viewed again. For a particular user, frequent sub-sequence mining can identify individual access patterns. Still other techniques are also contemplated to determine which network site and/or portions of the network site to prefetch.

Figure 4:
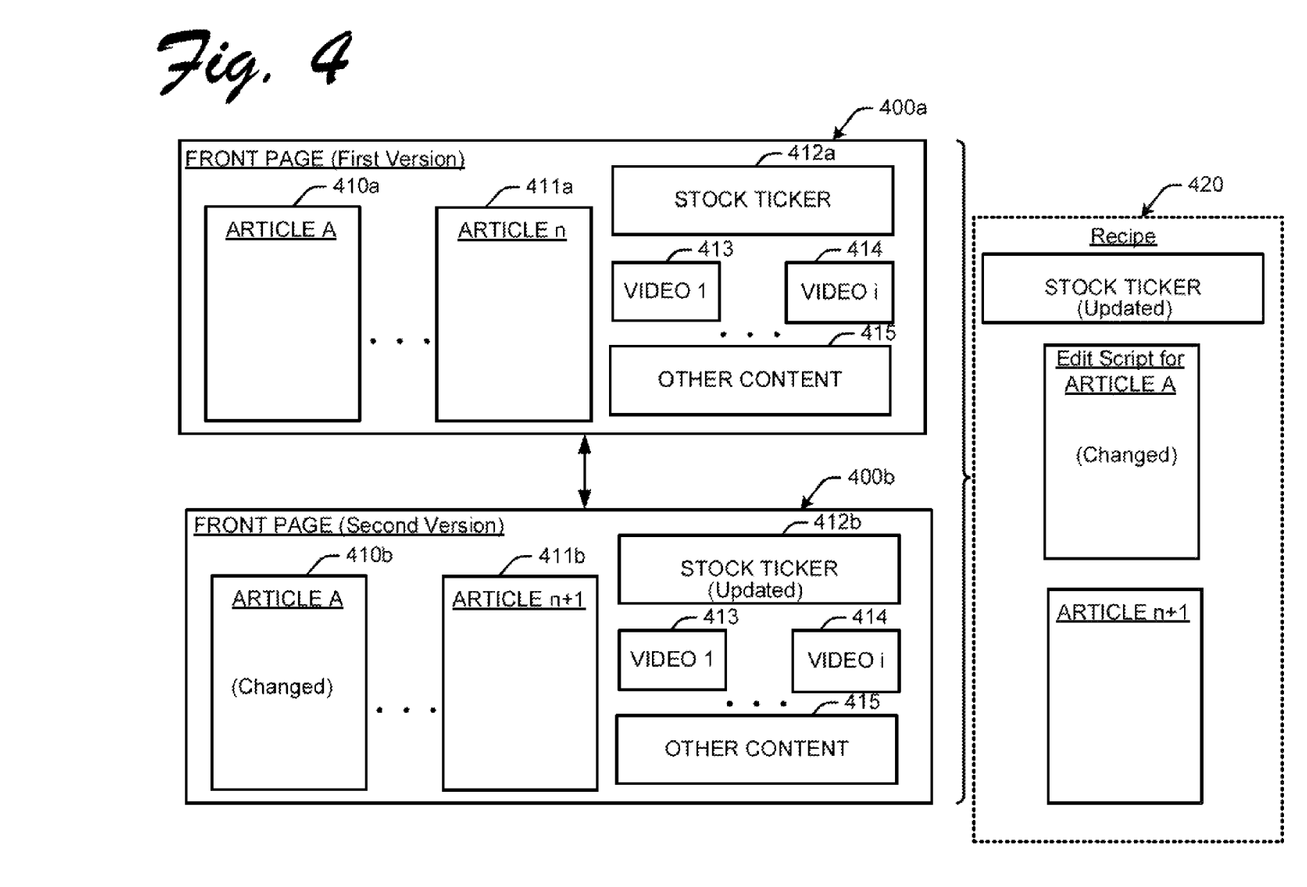
FIG. 4 is a high-level illustration of updating a cache to reduce bandwidth usage of a mobile client.

FIG. 4 is a high-level illustration of updating a cache to reduce bandwidth usage of a mobile client. Continuing with the illustration discussed above for FIG. 3, the commuter may use the mobile client to visit the newspaper's home page during the train ride using an expensive carrier network.

In the illustration, the front page may have changed somewhat from the first version 400*a* to the current (or second) version 400*b*, reflecting changed articles 410*b*, new article 411*b*, and updated object 412*b*. The other articles (e.g., article B) have not changed. As mentioned above, a proxy may track contents of the cache, and can fetch the newest version (e.g., a second version of the network content, referred to as 400*b*) from the newspaper network site. From these two versions, the comparator can generate a recipe 420 to construct a copy of the second version of the network content 400*b* on the mobile client. Accordingly, the mobile client only has to download the recipe 420 over the expensive network connection and apply it to its cached content (a copy of first version 400*a*).

In addition to providing the user with an up-to-date version of the network content, the content generated using the recipe can be used to update the client's cache. Later, when the commuter wants the latest value of the stock indexes (via a third version of the network content, not shown), a new recipe based on the new version of content in the cache (400*b*) can be used, and hence can be smaller than if the cache had not been updated. That is, only the latest stock index needs to be included in the new recipe not the changes to the front page between the first and second versions.

The user may also select an article about the Fed's latest speech, which may be provided on a different network site that the user has not previously visited. The article, however, may already reside in the cache, because the mobile client prefetched all links on the front page while connected to the inexpensive network. In an example, the proxy may send back a recipe with "no changes," if the article has not changed from the first version. Accordingly, the mobile client has been saved from downloading the article via the expensive network connection.

The technique described herein may be utilized even for poorly designed web pages. That is, it is not uncommon for websites to set time-to-live (TTL) values that are too low, or to indicate that a given webpage should never be cached even for content that is not changing. As such, the mobile client would traditionally download the content again, even though the content did not change. But because the proxy 250 compares the actual "new" version against the cached "old" version and determines that these versions are the same, the proxy sends a "no changes" recipe and the mobile client does not accrue the expensive bandwidth cost of having to download the content again.

It can be seen by these illustrations, that the systems and methods described herein effectively use the availability of inexpensive bandwidth to reduce expensive bandwidth consumption by mobile clients. The systems and methods utilize cache space by taking advantage of supposedly "stale" cached objects, reduce the latency of requests that are correctly predicted as being accessed, and reduce the bandwidth cost of prefetching and the cost of prefetch mispredictions. The systems and methods may also be used to improve latency for the slow mobile link.

Before continuing, it should be noted that the examples described above are provided for purposes of illustration, and are not intended to be limiting. Other devices and/or device configurations may be utilized to carry out the operations described herein.

Figure 5:
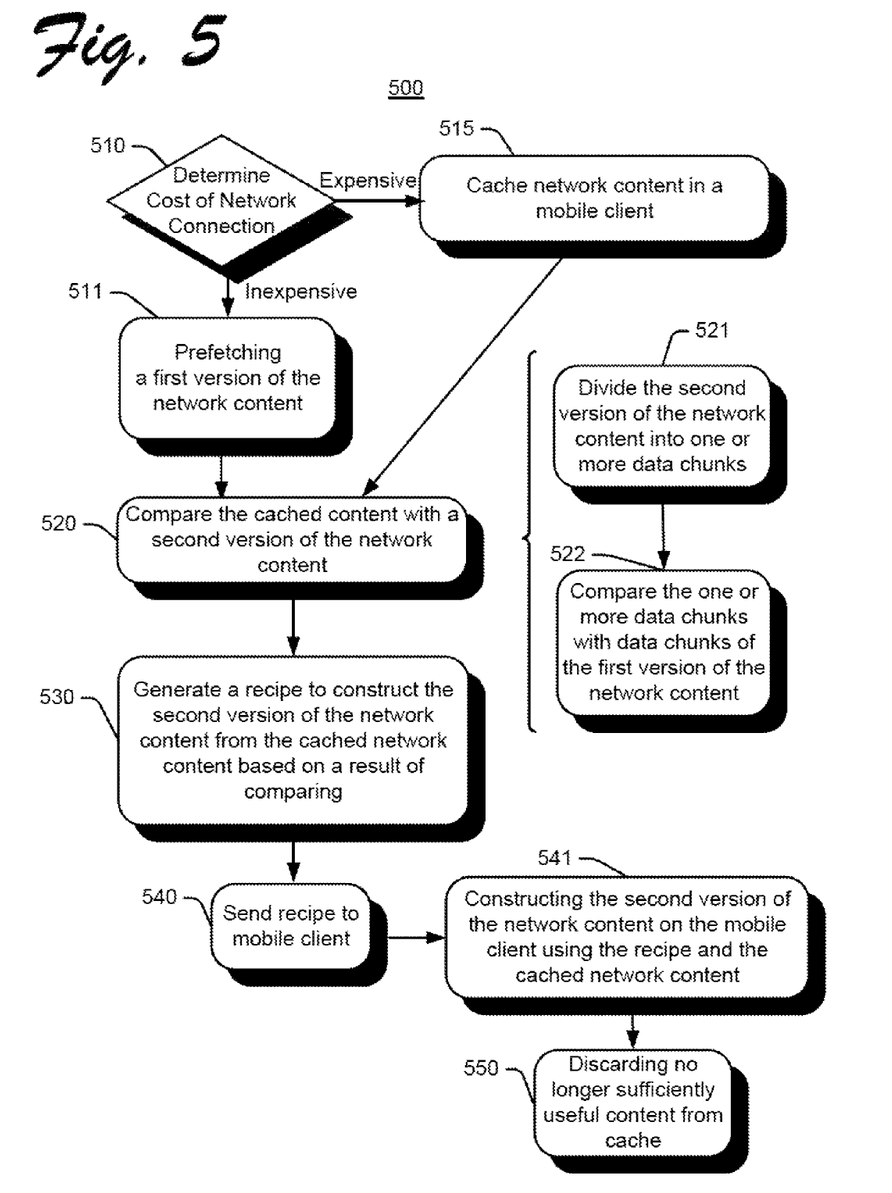
FIG. 5 is a flowchart illustrating example operations which may be implemented to reduce bandwidth usage of a mobile client.

FIG. 5 is a flowchart illustrating example operations that may be implemented to reduce bandwidth usage of a mobile client. Operations 500 may be embodied as logic instructions on one or more computer-readable mediums. When executed on one or more processors, the logic instructions cause a general purpose computing device to be programmed as a special-purpose machine that implements the described operations. In an example, the components and connections depicted in the figures may be used.

Operation 510 determines the cost of a network connection. If the mobile client is connected via an expensive link, then network content may be cached as the user visits network sites, but network content may not be prefetched (operation 515). Operation 515 includes caching a first version of network content in the mobile client. However, if the mobile client is connected via an inexpensive link, a first version of network content may in addition be prefetched to the mobile client's cache (operation 511).

In either case, operation 520 includes comparing the cached content with a second version of the network content. In an example, operation 520 may further include operation 521 dividing the second version of the network content into one or more data chunks, and operation 522 comparing the one or more data chunks with data chunks of the first version of the network content.

It is noted that prefetching may occur while the mobile client is connected via an inexpensive network connection, and comparing may occur while the mobile client is connected via an expensive network connection.

Operation 530 includes generating a recipe for constructing a copy of the second version of the network content from the cached network content based on a result of the comparing. In an example, a size of the recipe is proportional to changes between the first and second versions of the network content. That is, the recipe is not necessarily just a copy of the updated content. The recipe may include a reference to a data chunk that is unchanged between the first version of the network content and the second version of the network content. The recipe may also include a reference to a data chunk of the first version of the network content and an edit script to transform that data chunk into a data chunk of the second version of the network content.

Operation 540 includes sending the recipe to the mobile client. In an example, operation 541 includes constructing a copy of the second version of the network content on the mobile client by using the recipe and the cached network content.

The operations shown and described herein are provided to illustrate example implementations. It is noted that the operations are not limited to the ordering shown. By way of illustration, operation 550 may include discarding no longer sufficiently useful cached content (e.g., based on probability metrics).

Still other operations may also be implemented. In other example operations, prefetching may include determining a subset of the network content that the mobile client is expected to use before the subset has diverged beyond a threshold. Any suitable threshold may be implemented. The subset may be prefetched as the first version of the network content.

In still other example operations, prefetching may include determining a subset of the network content based in part on a likelihood the mobile client is expected to use a piece of the network content and an estimate of likely divergence of a current version of the piece of the network content and one or more future versions of the piece of the network content. It is noted that this allows for an estimate of divergence over time that is, how much divergence occurs with the next version, the version after the next version, and so on. The subset may be prefetched as the first version of the network content.

The operations may be implemented at least in part using an end-user interface (e.g., web-based interface). In an example, the end-user is able to make predetermined selections to configure the mobile client, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method, comprising:
  caching a first version of network content in a mobile client while the mobile client is connected via a first network connection; and
  while the mobile client is connected via a second network connection:
    comparing the cached content with a second version of the network content;
    generating a recipe to construct the second version of the network content from the cached network content based on a result of the comparing; and
    sending the recipe to the mobile client,
  wherein the first network connection is less expensive than the second network connection.

2. The method of claim 1 further comprising constructing the second version of the network content on the mobile client using the recipe and the cached network content.

3. The method of claim 1 wherein a size of the recipe is proportional to changes between the first and second versions of the network content.

4. The method of claim 1 wherein caching further comprises:
  determining a subset of the network content that the mobile client is expected to use before the subset has diverged beyond a threshold; and
  prefetching the subset as the first version of the network content.

5. The method of claim 1 wherein caching content further comprises:
  determining a subset of the network content based in part on a likelihood the mobile client is expected to use a piece of the network content and an estimate of likely divergence of a current version of the piece of the network content and one or more future versions of the piece of the network content; and prefetching the subset as the first version of the network content.

6. The method of claim 1 wherein comparing further comprises:
dividing the second version of the network content into one or more data chunks; and
comparing the one or more data chunks with data chunks of the first version of the network content.

7. The method of claim 6 wherein the recipe includes a reference to a data chunk that is unchanged between the first version of the network content and the second version of the network content.

8. The method of claim 6 wherein the recipe includes a reference to a data chunk of the first version of the network content and an edit script to transform that data chunk into a data chunk of the second version of the network content.

9. The method of claim 1 further comprising discarding stale cached content based on probability metrics.

10. A system, comprising:
a cache in a mobile client, the cache configured to store a first version of network content while the mobile client is connected via a first network connection;
a comparator to compare the first version of the network content with a second version of the network content;
machine readable code stored in a non-transient computer-readable medium at the mobile client, the machine readable code executable by one or more processors in the mobile client to, while the mobile client is connected via a second network connection, the second network connection being more expensive than the first network connection, construct the second version of the network content from the network content in the cache based on a result of comparing the first and second versions of the network content.

11. The system of claim 10 wherein the cache is updated while the mobile client is connected via an inexpensive network connection.

12. The system of claim 10 wherein the first version of the network content is a subset of network content that the mobile client is expected to use before the subset has diverged beyond a threshold.

13. The system of claim 10 wherein the first version of the network content is a subset of the network content based in part on a likelihood the mobile client is expected to use a piece of the network content and an estimate of likely divergence of a current version of the piece of the network content and one or more future versions of the piece of the network content.

14. The system of claim 10 wherein the comparator further divides the second version of the network content into one or more data chunks, and compares the one or more data chunks with data chunks of the first version of the network content.

15. The system of claim 10 wherein the result of the comparator includes an edit script.

16. The system of claim 10 wherein the result of the comparator includes a reference to a data chunk that is unchanged between the first version of the network content and the second version of the network content.

17. The system of claim 10 wherein the result of the comparator includes a reference to a data chunk of the first version of the network content and an edit script to transform that data chunk into a data chunk of the second version of the network content.

18. A system, comprising program code stored on non-transient computer-readable storage media, the program code executable by one or more processors to:
cache a first version of network content on a mobile client while the mobile client is connected via a first network connection; and
while the mobile client is connected via a second network connection, the second network connection being more expensive than the first network connection:
compare the first version of the network content with a second version of the network content; and
construct a copy of the second version of the network content on the mobile client from the cached network content based on a result of comparing the first and second versions of the network content.

19. The system of claim 18 wherein the first version of the network content is a subset of the network content selected based in part on a likelihood the mobile client is expected to use the subset of the network content.

* * * * *